UNITED STATES PATENT OFFICE.

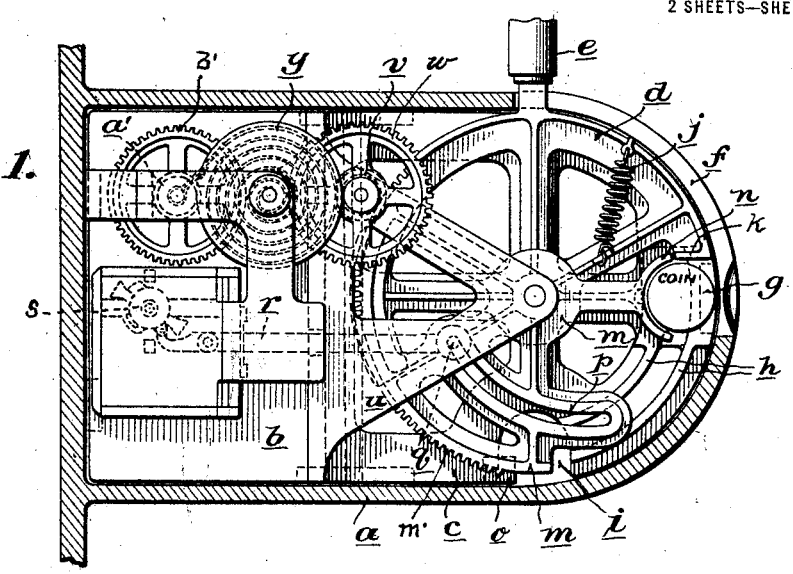
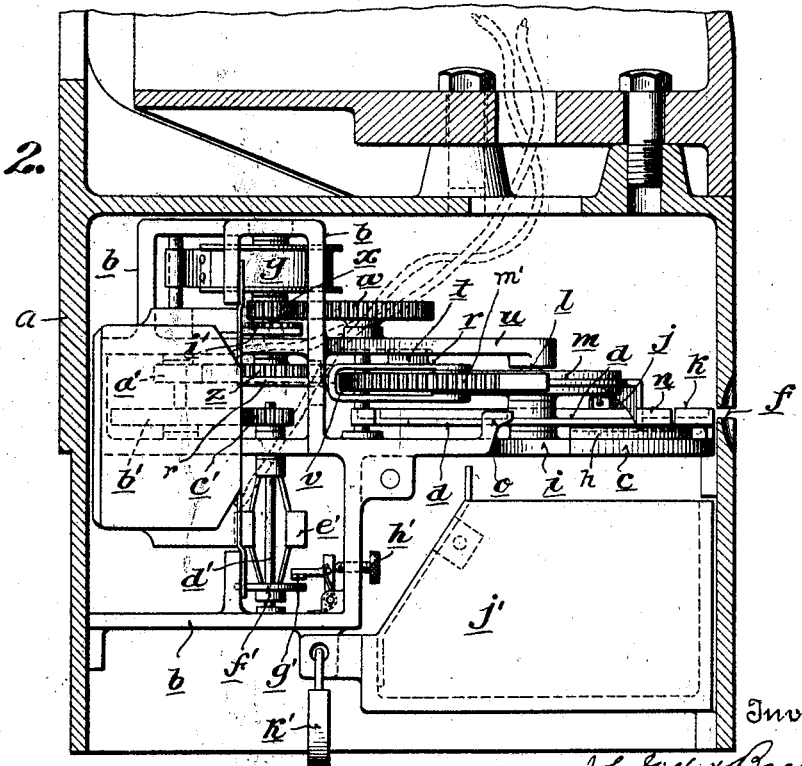

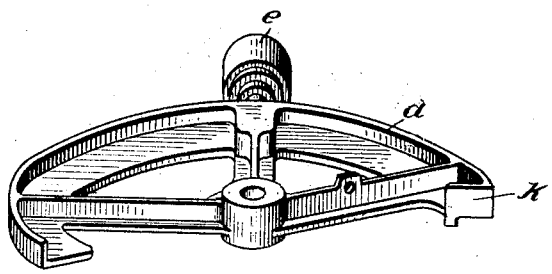
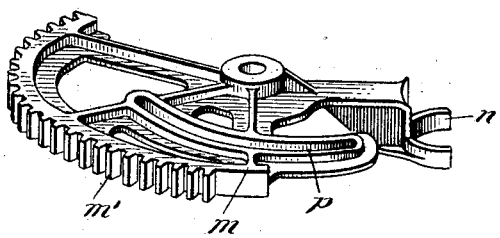
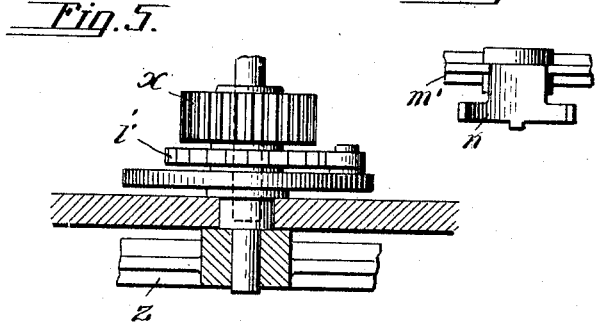
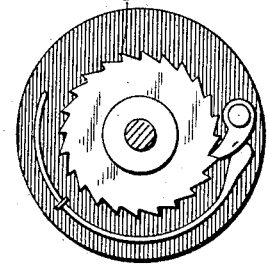

JOHN GILBERT BASSETTE, OF GROTON, NEW YORK, ASSIGNOR TO GROTON ELECTRICAL DEVICES INC., OF GROTON, NEW YORK, A CORPORATION OF NEW YORK.

COIN-CONTROLLED ELECTRIC SWITCH.

1,378,933. Specification of Letters Patent. Patented May 24, 1921.

Application filed October 28, 1918. Serial No. 260,004.

*To all whom it may concern:*

Be it known that I, JOHN GILBERT BASSETTE, a citizen of the United States of America, and a resident of Groton, county of Tompkins, State of New York, have invented certain new and useful Improvements in Coin-Controlled Electric Switches, of which the following is a full and clear specification.

The object of this invention is to provide a simple apparatus in which a manually-operable coin-controlled mechanism is adapted to close an electric switch and maintain the same in closed position throughout the lapse of a predetermined period of time, simple devices being provided whereby this time-period may be varied. This apparatus is capable of use in a variety of relations and my invention, therefore, is not limited with respect to use.

One use I propose making of my device is in connection with a hand-drying machine in which an electric motor is arranged to drive a blower, it being desirable with this class of machines, when they are operable by a coin, to cause the blower to operate a predetermined length of time and then automatically stop, the parts being left in position to receive another coin for a subsequent operation of the blower.

In the drawings—

Figure 1 is a horizontal sectional view, and Fig. 2 is a vertical sectional view of one form of apparatus embodying my invention.

Figs. 3, 4, 5, 6 and 7 are views of details hereinafter described.

Referring to the drawings by reference characters, $a$ designates a casing and $b$ a metal frame inclosed therein and supported thereby, this frame embodying a horizontal shelf $c$ arranged in the front part of the casing. Journaled upon this shelf is a segment $d$ provided at one end with a handle $e$ which projects through a horizontal slot $f$ in the front wall of the casing, so as to be in position to be readily manipulated by the operator. Slot $f$ terminates near the center of the front side of the casing, and at this point the coin $g$ is adapted to be inserted. The coin when inserted lies upon the shelf $c$, a pair of parallel arcuate flanges $h$ being provided on the upper face of the shelf to provide a smooth pathway for the coin on its passage from the point of insertion to the delivery-opening $i$ in the shelf. The segment $d$ is provided with a return spring $j$ and also with an upstanding coin-engaging lug $k$.

Journaled on the same upright shaft $l$ with the segment $d$ is another segment $m$ whose front edge is provided wtih a coin-receiving pocket $n$ which, when segment $m$ is in its normal position, lies just inside of the coin-receiving end of slot $f$, so that when a coin is in place, as shown in Fig. 1, the coin will form a locking device for connecting the two segments together. When the coin is thus in place, the rotation of the segment $d$ by means of the handle $e$ will, through the medium of the coin, cause segment $m$ to rotate with it, thus carrying the coin in an arcuate path on the ribs $h$ until it drops into the delivery hole or slot $i$, an upstanding lug $o$ being provided on the shelf $c$ at the far side of the slot to insure the dislodgment of the coin and its discharge through slot $i$.

The segment $m$ is provided with a cam-slot $p$ in which runs a roller-pin $q$ supported between the outer ends of a bifurcated rod $r$, the arms formed by the bifurcation of the rod being arranged to embrace the rear edge of the segment $m$. The rear end of the rod is connected to an electric switch $s$, this switch being of any suitable construction, preferably a quick-acting, two-pole switch now well known on the market. The switch-operating rod $r$ is adapted to be slid rearwardly and forwardly by the cam-slot $p$, and in these movements it is guided by a lug $t$ on the upper part of the bifurcation and adapted to work in a groove in the under side of a frame member $u$. The cam-slot is of such shape that upon rotation of the segment $m$ to the right under manipulation of the coin, the switch-rod will be forced backwardly and then, upon return of the segment to normal position by the spring-actuated mechanism which is hereinafter described, the switch-rod will be drawn forwardly. At the extremity of the inward or backward movement of the switch-rod, the switch snaps to closed position and then the switch stays closed until the switch-rod is pulled outwardly to its normal position, in which position the switch stands open, as shown in Fig. 1.

The inner or rear edge of segment $m$ is provided with cog-teeth which mesh with a pinion $v$ affixed to an upright shaft carrying a gear-wheel $w$. This gear $w$ in turn meshes with a pinion $x$ affixed to the shaft of a convolute-clock-spring $y$. Affixed to the lower extreme of the shaft of the clock-spring is another gear $z$ which in turn meshes with a pinion $a'$. The shaft carrying the pinion $a'$ is provided with a larger gear $b'$ which meshes with a pinion $c'$ affixed to the upper end of the shaft $d'$ of a small centrifugal governor $e'$. A friction disk $f'$ is affixed to the lower ends of the governor arms so that, as the governor is speeded up, the disk will rise on the shaft $d'$ and come into frictional contact with a retarding shoe $g'$.

It will be observed that, through the medium of the gears $v$, $w$ and $x$, the spring will be wound up when the segment $m$ is rotated through the medium of the inserted coin and hand-segment $d$. Immediately upon the release of the segment $m$ by the dropping of the coin, the clock-spring will react and thus return the segment to normal position through the same train of gears. The speed with which this return movement is performed will be determined by the governor adjustment. The governor will be rapidly rotated through the medium of the gears $z$, $a'$, $b'$ and $c'$, but its speed will be determined by the degree of friction between the disk $f'$ and the brake-shoe $g'$. The nearer the shoe $g'$ is adjusted to the face of the disk $f'$, the greater will be the retardation of the return-gearing and, consequently, the greater will be the length of time the switch remains closed. To adjust the brake shoe upwardly and downwardly to thus vary the speed of the governor, I provide a set-screw $h'$ which is tapped through one of the upright bars of the frame $b$. To prevent the governor mechanism being operated during the winding up of the spring, I arrange a ratchet device $i'$ on the spring shaft.

I arrange below the coin-delivery slot $i$ a coin-receiving box $j'$ which is adapted to be locked removably in position by a suitable lock $k'$. When this coin-box is locked in position, it will be observed that it forms a guard for the governor-screw $h'$, thereby preventing manipulation of this screw except when the coin-box is removed, thus putting it out of the power of any person, except the authorized person, to surreptitiously adjust the device for a longer period of operation.

The nature and scope of the invention having been thus indicated and its preferred embodiment having been specifically described, what is claimed as new is:

1. In an apparatus of the class set forth, an electric switch, a pair of members adapted to be interlocked by a coin, one of said members being manually operable and the other coin-operated, a spring, means adapted to tension this spring when the coin-connected members are operated, said means serving through the action of the spring to return the coin-operated member to normal position after delivery of the coin, devices for closing the switch by the manual stroke of the coin-operated member upon delivery of the coin and maintaining it closed during the return of the coin-operated member to normal position.

2. In an apparatus of the class set forth, an electric switch, a pair of members adapted to be interlocked by a coin, one of said members being manually operable and the other coin-operated, a spring, means adapted to tension this spring when the coin-connected members are operated, said means serving through the action of the spring to return the coin-operated member to normal position after delivery of the coin, devices for closing the switch by the manual stroke of the coin-operated member upon delivery of the coin and maintaining it closed during the return of the coin-operated member to normal position, variable speed-regulating means being provided to govern the period of time consumed in returning the parts to normal.

3. In an apparatus of the class set forth, an electric switch, coin-connected means for manually closing the same, a spring and means for tensioning the spring in the act of closing the switch, said spring and its tensioning means serving to return the parts to normal and thus open the switch after release of the coin.

4. In an apparatus of the class set forth, an electric switch, coin-connected means for manually closing the same, a spring and means for tensioning the spring in the act of closing the switch, said spring and its tensioning means serving to return the parts to normal and thus open the switch after release of the coin, variable speed-regulating devices being applied to said tensioning means to govern the return of the parts to normal and consequently the time of opening of the switch.

5. In a device of the class set forth, a quick-acting electric switch, a push-and-pull rod adapted to close as well as open the switch, a coin-connected mechanism for operating the rod, a spring-return mechanism adapted to be wound up when the rod is manually pushed in to close the switch and to unwind when the coin is released and thereby pull the rod to open the switch, and governing devices controlling the operation of the spring mechanism during the return of the switch rod.

6. In an apparatus of the class set forth, a pair of rotatable actuating members adapted to be interlocked by the insertion of a coin, means for positively disconnecting and delivering the coin away from said members at a predetermined point in their conjoint movement, a spring means adapted to be wound up by connection with one of said members and to return its connected member when the coin is released, a governor means connected to said spring means to regulate the return of the said member, and an electric switch and devices whereby the switch is closed by the act of winding up the spring and is opened at a predetermined point during the unwinding of the spring.

7. In an apparatus of the class set forth, a casing, a support, a manually-operable coin-pusher adapted to oscillate in a horizontal plane, a superposed oscillating coin-operated member, a coin-supporting slotted member terminating in a coin-delivery opening, and an adjacent ejecting lug adapted to forcibly eject the coin from between the two members, an electric switch and means for closing the same by the manual stroke of the coin-operated-member, and means for retarding the return of the coin-operated-member to normal to thus delay the opening of the switch.

8. In an apparatus of the class set forth, a horizontally-rockable manually-operable member adapted to push a coin, a horizontally-operable coin-operated member, means for positively deflecting the coin at a predetermined point in the conjoint movement of the two members whereby the manual thrust serves to eject the coin, said coin-operated member being provided with a cam-slot, a push-and-pull rod operable by said slot on the forward stroke of the coin-operated member, a switch adapted to be closed by the push action of this rod and to be opened by the pull action, and means for retarding the time of return of the coin-operated member to normal position to thus retard the opening of the switch.

This specification signed this twenty first day of October, A. D. 1918.

JOHN GILBERT BASSETTE.